United States Patent [19]

Patterson et al.

[11] Patent Number: 5,072,580
[45] Date of Patent: Dec. 17, 1991

[54] SYSTEM FOR OPERATING GAS TURBINE JET ENGINE WITH FAN DAMAGE

[75] Inventors: Gregory S. Patterson, Stuart; James B. Kelly, Lake Worth, both of Fla.

[73] Assignee: United Technologies Corporation, Hartford, Conn.

[21] Appl. No.: 553,466

[22] Filed: Jul. 17, 1990

Related U.S. Application Data

[62] Division of Ser. No. 316,265, Feb. 27, 1989, Pat. No. 4,959,955.

[51] Int. Cl.⁵ ............................................. F02K 1/18
[52] U.S. Cl. ................................... 60/242; 364/431.02
[58] Field of Search .................... 60/223, 226.1, 233, 60/235, 236, 239, 242, 262; 364/431.02

[56] References Cited

U.S. PATENT DOCUMENTS

| | | | |
|---|---|---|---|
| 4,139,887 | 2/1979 | Levesque | 60/242 |
| 4,159,625 | 7/1979 | Kerr | 60/236 |
| 4,294,069 | 10/1981 | Camp | 60/239 |
| 4,467,600 | 8/1984 | Peikert | 60/204 |
| 4,581,889 | 4/1986 | Carpenter et al. | 60/242 |

*Primary Examiner*—Louis J. Casaregola
*Attorney, Agent, or Firm*—Edward L. Kochey, Jr.

[57] ABSTRACT

Normal high load operation automatically varies nozzle area to maintain an optimum engine pressure ratio (EPR). An error signal representing fan damage is established by comparing the actual EPR to the predicted EPR. Compressor stalls are also monitored. In response to these signals a minimum nozzle area is set and modified. Automatic operation to hold EPR and afterburning is inhibited. Further signals representing satisfactory operation may reset the inhibiting action.

11 Claims, 4 Drawing Sheets

SYSTEM FOR OPERATING GAS TURBINE JET ENGINE WITH FAN DAMAGE

DESCRIPTION

TECHNICAL FIELD

This is a division of copending application Ser. No. 07/316,265, filed on Feb. 27, 1989 (U.S. Pat. No. 4,959,955).

The invention relates to gas turbine engines with variable exhaust nozzles, and in particular, to accommodation of compressor fan damage.

BACKGROUND OF THE INVENTION

Gas turbine engines for aircraft often use variable area exhaust nozzles. Such engines may operate at low power in a base control mode, wherein the nozzle area is fixed. Throttle action by the pilot sets either a fuel flow rate or a engine RPM to be achieved, with pressure distribution through the engine settling out at a new value. It is known, however, that the thrust may be increased and the overall efficacy of engine operation improved by changing the area of the nozzle to an optimum condition for the new operating mode. If the nozzle closes too much, it may cause a compressor stall, while if it opens more than is necessary, over expansion within the discharge nozzle occurs.

It is accordingly known to measure the engine pressure ratio, which is the ratio of pressure leaving the gas turbine to the pressure entering the compressor and to operate nozzle to maintain this parameter. Essentially, the pressure ratio is known for the engine design which will, for any particular RPM, provide reasonable tolerence from stall with optimum thrust.

The fan, or first stage of the compressor, of an engine, is susceptible to fan damage in various situations such as the ingestion of birds, ice or other foreign objects. The initial damage may result in a stall event. In accordance with normal procedures the nozzle is opened to an increased area until recovery from the stall, and then closed down to its normal operating position. Since fan damage has occurred, it is quite possible for the engine to continue to repeatedly stall, producing unstable operation. This is possible with a fixed nozzle condition, but even more so when the engine is operating in the engine pressure ratio mode to achieve optimum thrust.

It is an object of the invention to detect and accommodate compressor fan damage, thereby effecting a proper choice of stall recovery action.

SUMMARY OF THE INVENTION

The gas turbine engine of the invention is a turbofan, with low and high pressure compressor, a turbine, an augmentor or afterburner and a variable area exhaust nozzle. A portion of the fan flow passes through bypass ducts to the exit of the turbines. There is a known anticipated engine pressure ratio for any operating air flow and nozzle area condition which represents an undamaged compressor. It operates in the engine pressure ratio control mode with the nozzle being adjusted to maintain a preselected engine pressure ratio at each high load operating condition. It is also capable of operating in a base control mode with a fixed nozzle area.

In accordance with the objective to detect and accommodate fan damage, an enable logic disables the rest of the logic in certain situations where input data would be unreliable.

The relationship between engine airflow, exhaust nozzle area and engine pressure ratio is unique for a turbofan that is undamaged. Damage due to ingestion of foreign objects results in reduced airflow rate of the fan and stall limit for a given rotor speed. Therefore, detection of fan damage is possible by comparing the actual engine pressure ratio for the damaged fan to the predefined engine pressure ratio (EPR), airflow and exhaust nozzle area relationship for the undamaged fan. A percent EPR error is thereby established based on that comparison.

In a fan damage and sensor error detection means, this error is compared to tolerable errors. A relatively low sensor error detect is established where all potential sensor tolerances are on one side. A fan damage detect is set at a higher level. Various responses occur depending on whether the percent error signal is above the fan detect level, below the sensor error detect level, or in the band between the two. Each of these is combined with the signal indicating an immediately preceding stall and the action taken varies depending on whether or not there has been an immediately preceding stall. Action other than stall recovery is not taken until a quasi steady state operation is a achieved. Therefore, the phrase "in the presence of a stall" is the equivalent of "after an immediately preceding stall".

If the error signal obtained is above the fan damage detect level and a stall has also occurred, the action taken depends on whether damage has previously been declared, this in turn being established by the setting of a fan damage flag. In the first instance, with no earlier fan damage detected, a fan damage flag is set. A minimum area of the nozzle is set with this area being selected as a function of the percent EPR error. EPR control is also stopped and after burning or augmentation is inhibited.

Should the EPR error be above the fan damage detect level in the presence of a flag which represents early detected fan damage, the nozzle area is ratcheted to increase the previously selected minimum area or the area measured at stall, whichever is larger, by an additional percentage.

Should the percent error be above the fan damage detect level in the absence of a stall, with no earlier damage detected, a sensor error flag is set and the nozzle area is set at a scheduled minimum area. EPR control requests for exhaust nozzle areas less than the scheduled minimum are ignored, but augmentation is not inhibited.

Should the percent EPR level be above the fan damage detect level in the absence of a stall, but with either the sensor error or the fan damage flag being set, no additional action is taken.

Should the percent EPR error be below the sensor error detect level, regardless of whether or not there was an immediately preceding stall, the sensor error and fan damage flags, if set, are reset. The system is returned to EPR control and afterburning is permitted.

Should the percent EPR error be in the band between the sensor error detect level and the fan damage detect level in the presence of a stall, operation is continued unchanged unless a sensor error or fan damage flag was set previously.

If the percent EPR error is in the band between the sensor error and the fan detect level in the presence of a stall and a flag has been set indicating either sensor error or fan damage error in the past, the nozzle area is increased a preselected amount with afterburner avail-

DESCRIPTION OF THE PREFERRED EMBODIMENT

Figure 1:
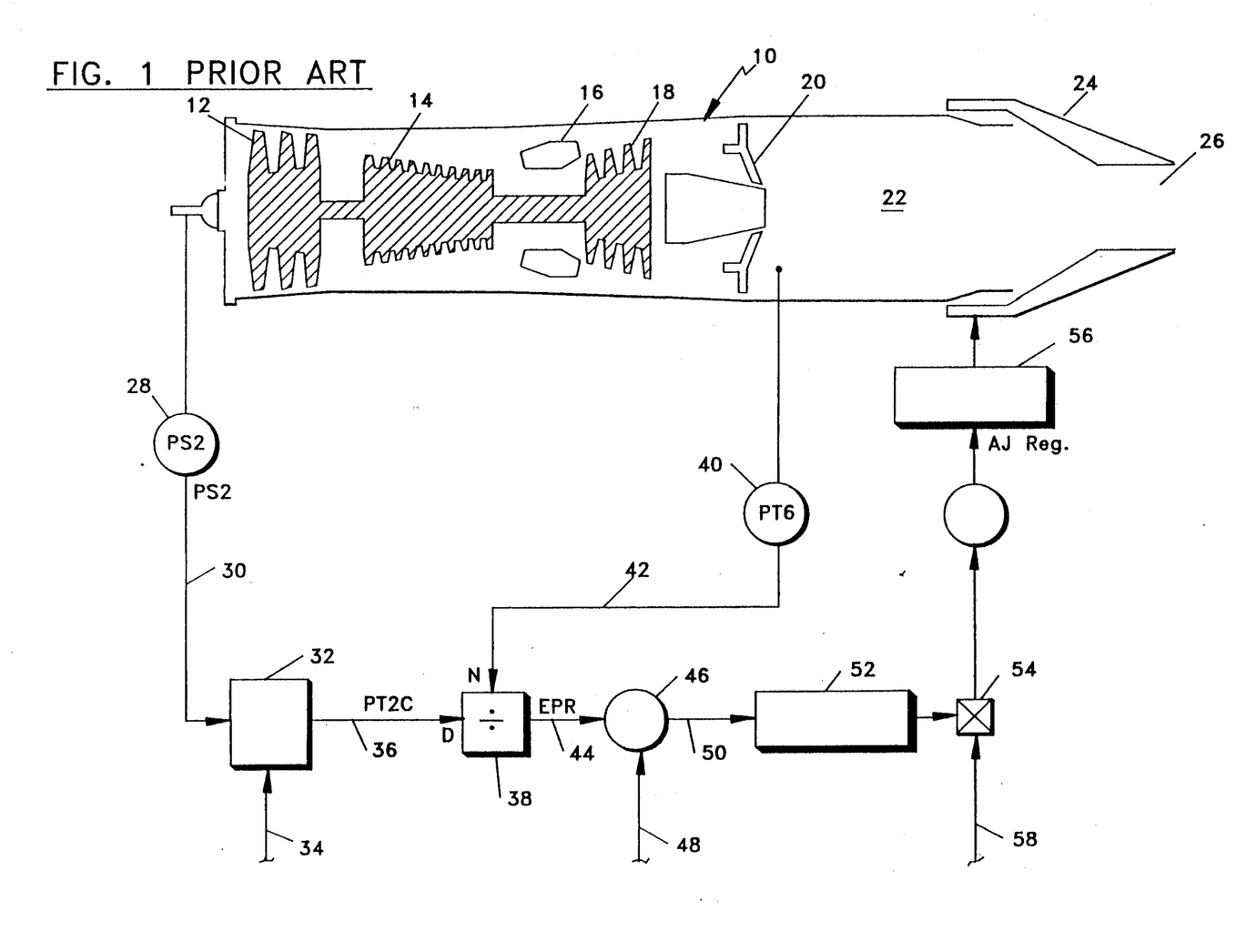
FIG. 1 is a gas turbine engine with the prior art control scheme illustrated thereon.

Referring to FIG. 1, a gas turbine engine, shown generally as 10, has a fan or low pressure compressor 12 and high pressure compressor 14. Burners 16 are located upstream of turbine 18 with augmentor flameholders 20 followed by augmentor 22. Variable area exhaust nozzle 24 discharges gas through nozzle area 26.

The known control system of FIG. 1 includes static pressure sensor 28, sensing static pressure at the low pressure compressor inlet. In the designation PS2 represents static pressure and the numeral 2 refers to the location within the engine. A signal representing this pressure passes through control line 30 to total pressure (PT2) calculator 32. It is here combined with a corrected fan speed signal 34 producing a corrected total pressure signal passing through line 36 to a division point 38.

Pressure sensor 40 senses the pressure in the afterburner after the turbine exhaust, passing a total pressure signal through control line 42 to division point 38.

At the division point, the signals are divided thereby obtaining a pressure ratio signal by dividing the pressure PT6 by the pressure PT2. The signal is passed through control line 44 to comparison point 46 where it is compared to an EPR set point signal 48. This set point signal is a preselected characteristic which is a function of the corrected engine speed and the total inlet pressure PT2, corrected. Any difference here results in a control error signal through line 50 which with appropriate proportional and integral action 52 passes to multiplier 54 where AJ scheduling as a function of the base schedule is performed. This signal then acts through actuator 56 to adjust nozzle area 26 to achieve the set point EPR request.

The above described control loop which modifies the nozzle area to obtain a desired EPR is operative at high loads, for instance, greater than 90% power. At lower power, a base mode of operation is used wherein a control signal 58 representing a desired nozzle area passes through multiplier 54 to actuator 56 to set the nozzle at the desired area. In this case, proportional and integral trim request for AJ less than the base schedule are ignored such that the signal from 52 to multiplier 54 will be 1 or greater. The base area schedule is a function of inlet total temperature and inlet total pressure under normal operating conditions with an additional increase for augmentation operation.

The above described control schemes are based on known engine aerodynamics and are established to maintain a reasonable tolerance from a compressor stall condition. When a stall does occur, the nozzle is opened for stall recovery and then returned to the preexisting control position. In the event of damage to fan 12, the aerodynamics of the engine change, increasing the probability of a stall. With such an operating scheme, once recovery from a stall is accomplished, the engine reverts to its initial mode and if fan damage caused the stall, the engine would continue to stall and recycle resulting in unstable operation.

Normal stall recovery procedures involving the opening of nozzle 24 are unimpeded by my invention. The fan damage detection processing unit 59 (FIG. 7) incorporating the scheme shown generally in FIG. 2 operates to detect fan damage or sensor error which may cause stalling and to take appropriate action. After normal stall recovery techniques are used, the engine operates with the large area nozzle until the fan damage detection scheme described below performs its function. Operation then goes to the mode as determined by the fan damage detection scheme.

Figure 3:
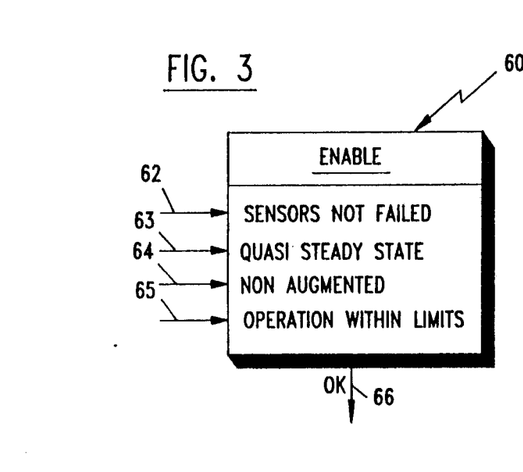
FIG. 3 is additional detail of the enable logic.

Enable logic means 60 (shown in more detail in FIG. 3) disables the detection scheme under conditions which would produce erroneous results. Typical inputs to enable the logic are shown in FIG. 3, wherein input 62 represents that the appropriate pressure and speed sensors have not failed. This is differentiated from the sensor error which produces erroneous readings which are accommodated later in the scheme. Signal 63 requires a quasi-steady state operation to enable the system. Signal 64 requires that operation be nonaugmented. Signal 65 requires that the operation be within predetermined limits. For instance, the engine must be above a selected speed with the nozzle area below a selected size. The inlet pressure must be above a preselected value, such as, 0.4 atmospheres to assure that the sensor is operating in a range where its tolerance would not adversely affect the system.

If all of the enablement conditions are met, an enabling signal passes through line 66 to EPR calculation means 70.

Figure 4:
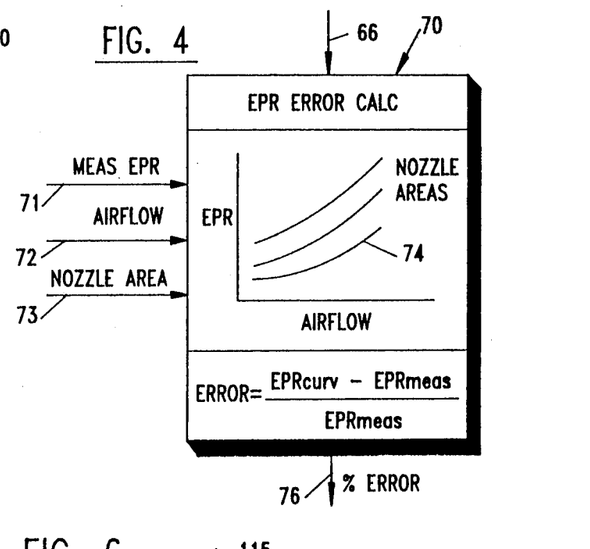
FIG. 4 is additional detail of the EPR error calculation.

Input to the EPR error calculation means 70 includes the measured EPR 71, the airflow 72 and the nozzle area 73. As indicated in more detail in FIG. 4, an undamaged engine has a known relationship 74 for any particular nozzle area with the anticipated engine pressure ratio being known as a function of airflow. Accordingly, from the input airflow and nozzle area an anticipated EPR is determinable. This is compared to the measured EPR to obtain a percent error signal in accordance with the formula EPR anticipated minus EPR measured divided by EPR measured times 100. A percent error signal accordingly is sent through control lines 76. The signal also passes through control line 77 for purposes which will be described hereinafter, but for current purposes it passes to fan damage and sensor error detect means 80.

The fan damage and sensor error detection means 80 also has as input a total pressure signal 82 representing the total pressure at the compressor inlet. As shown in more detail in FIG. 5, the logic defines a sensor error detect relationship 84 where the percent EPR error is shown as a function of the inlet pressure. This substantially represents the error which would occur if the tolerance of all sensing apparatus was off the ideal in a single direction. A fan damage detect relationship 86 is also established including some tolerance above the sensor error detect curve, for instance, 5% greater. A dead band 87 occurs between these two curves.

Figure 5:
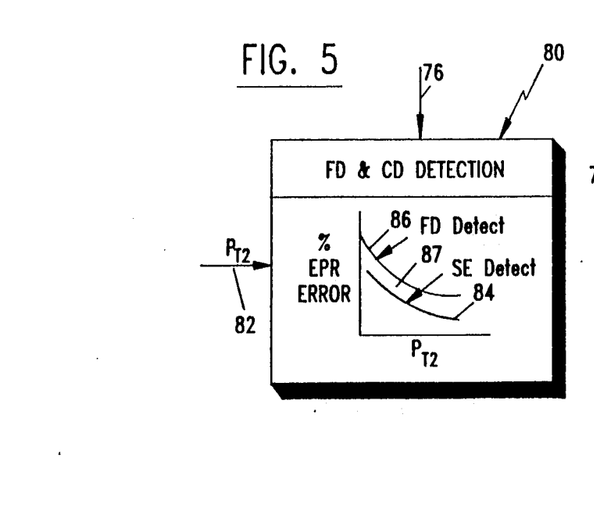
FIG. 5 is additional detail of the fan damage detection logic.

Within this detection means a percent error signal is compared to the detect curves producing one of three signals depending on whether the error is greater than the fan detect level 88, less than the sensor error level 90, or between the sensor error and the fan detect levels 92. As these control signals pass to the fan damage accommodation means, different actions are taken, not only with the three different signals, but in combination with each one of them as a function of whether or not there has been an immediately preceding stall, and also whether or not fan damage or sensor error has previously been declared.

Figure 2:
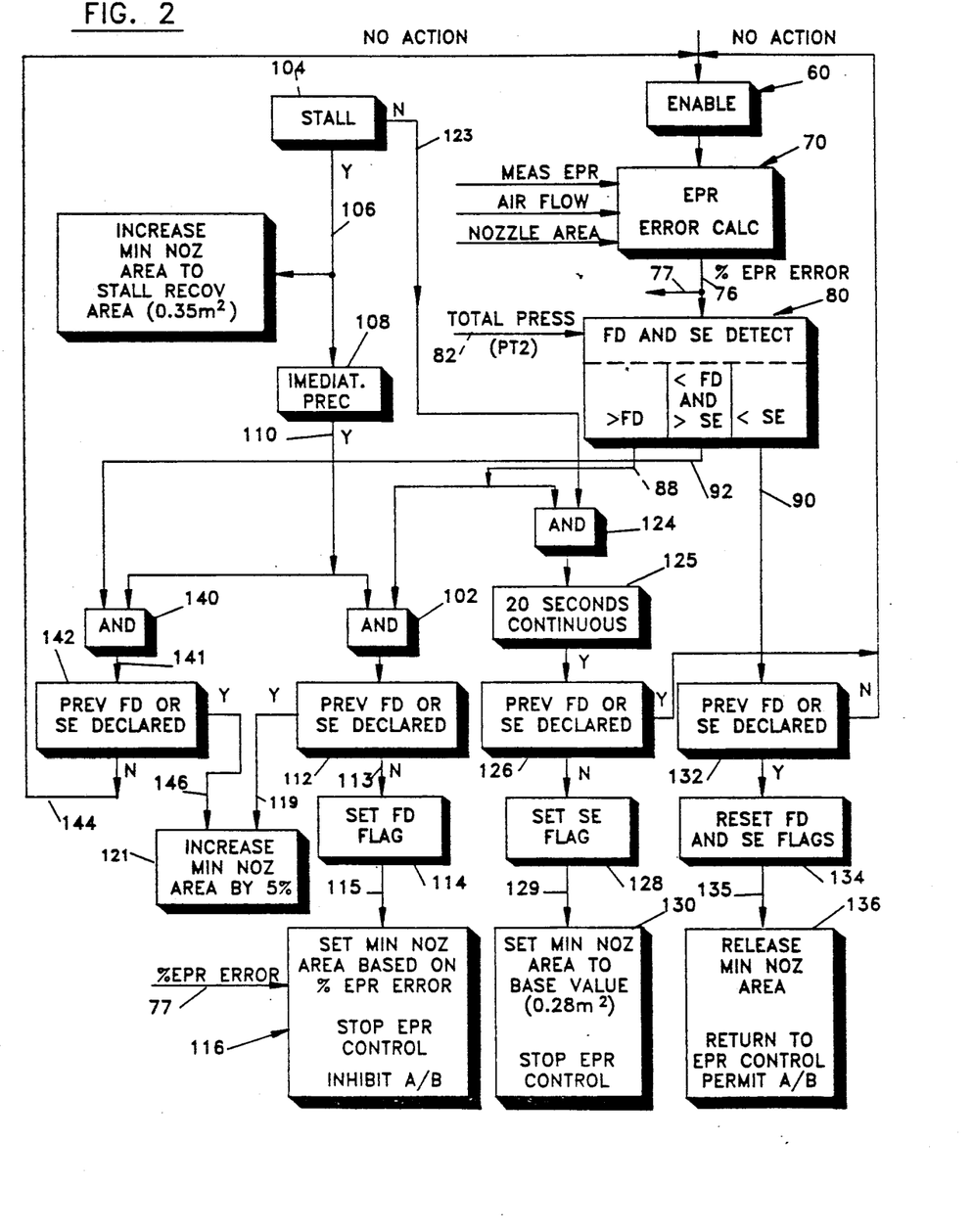
FIG. 2 is a logic diagram of the fan damage detection scheme.

Looking first at a situation where the error is greater than the fan damage detect level, an immediately preceding stall exists, and damage has not already been declared, the signal through line 88 passes to AND box 102 (FIG. 2). Stall detector 104 has passed a signal indicating a stall through line 106 to memory 108 which retains information indicating an immediately preceding stall. The YES signal for the preceding stall passes through line 110 to AND box 102. The signal passes to query box 112 questioning whether previous fan damage or sensor error has been declared. This would be noted by the establishment of flags, but at this point we are assuming that no damage has earlier been declared.

Accordingly, a signal passes through control line 113 to set FD flag box 114. This sets the flag for fan damage so that the logic later knows that fan damage was early declared. The signal then passes on to control line 115 to fan damage accommodation area set logic 116, shown in more detail in FIG. 6.

Figure 6:
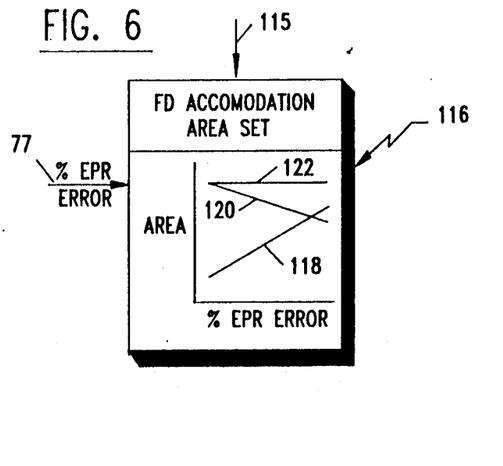
FIG. 6 is additional detail of a portion of the fan damage accommodation logic.

The early described percent EPR error signal passing through line 77 from EPR error calculation means 70 is used at this point and herein enters into the logic. Within the logic are three relationships representing the area with respect to the percent EPR error signal.

Curve 118 represents the nozzle area to be set based on the percent potential EPR error which is expected to avoid subsequent stalls. Curve 120 represents the area in relationship to the percent EPR error which will produce 75% thrust. Curve 122 represents the area for EPR error calculation after a stall and also the open limit for base mode operation.

The fan damage accommodation area set selects, based on the percent EPR error established, a minimum area to be established for the nozzle. This is preferably the no stall line 118 for the lower errors and the 75% thrust lines at the higher errors where it produces a lower nozzle area. This provides an increased nozzle area attempting to prevent further stalls while producing 75% thrust or greater, but as will be seen hereinafter, if this area is not sufficient, further corrective action will be taken.

Since an EPR error of this magnitude would invalidate the EPR control apparatus, EPR control is stopped and base mode control is established based on the selected nozzle area. Afterburning is also inhibited. In summary, in response to the high fan damage signal and an immediately preceding stall, a fan damage flag is set in the first instance, EPR control is stopped and afterburning is inhibited.

Returning now to the detect means 80 with a greater than fan damage detect signal 88, functions will be considered in response to a preceding fan damage determination. The presence of an immediately preceding stall is assumed so that the signals pass through AND box 102 to the previous declaration box 112. In this case, the flag has been set previously and accordingly control signal passes through control line 119 to increase area logic box 121. In accordance with the logic of that box, the nozzle area is increased a preselected amount, for instance 5%. No other change is made. If desired, a limit could be placed on the maximum area to be set.

In response to the above described logic the engine is operating on a base mode control scheme with a minimum nozzle area being established and for all practical purposes, maintained. The nozzle area may be increased during transient conditions, for instance, an impending or actual stall recovery condition.

Returning again to detection logic 80, it will be assumed that an error greater than a fan detect level exists in the absence of a stall, and further in the absence of a previously set fan damage or sensor error flag. The error signal 88 is combined with a no stall signal 123 in the AND box 124. This condition should be maintained for some time period, approximately 20 seconds, to further validate the detection accuracy. Since we are assuming that damage has not early been declared, the signal passes through declaration box 126 and line 127 to set sensor error flag 128. The sensor error flag is a record of the prior existence of the present described operation. The signal continues through line 129 to a nozzle area box 130.

Since the apparatus has indicated a high level of error, but no stall has occurred, it is assumed that a sensor error exists. Accordingly, control logic 130 sets the minimum nozzle area to the base value of 0.28 meter squared and stops EPR control. Afterburning is not inhibited.

Returning once more to detection logic 80, the greater than fan detect level signal, in conjunction with no stall, will be considered in light of a previously set flag. The signals again pass through the AND box 124 to the previous declaration box 126. If fan damage or sensor area has previously been declared, no action is taken.

The signal through line 90 of detect logic 80 represents a percent error signals which is lower than the sensor error detect level. If such a low signal is determined, nothing need be done where damage has never been declared. However, should damage have been previously declared, this low error level provides justification for resetting operation to avoid the inhibitions earlier placed on the system. Accordingly, the control signal from 90 passes through declaration box 132 to reset action box 134 where any previously set fan damage or sensor error flag is reset. The signal further passes through control line 135 to logic box 136 which releases the minimum nozzle area restriction, returns the system to EPR control and permits afterburning.

As described herein, a control signal through line 92 is produced by detect logic 80 when the error is in the band between the sensor error detect level and fan damage detect level. It is intended that in this area, if there is no stall, that no action be taken. If a stall of first occurrence happens, it is desirable to continue the control as is since the fan damage detect level has not been exceeded. However, if the previous damage was declared, as established by setting either the fan damage flag or the sensor error flag, it is desired to ratchet the nozzle area by increasing it 5%.

In order to achieve this, the control signal line 92 passes to AND box 140 which requires the presence of a immediately preceding stall signal 110 to send a control signal through control line 141. Previous damage query box 142 operates such that in the event of not previous damage declaration, control signal through line 144 permits operation to continue as before.

If damage had previously been declared a signal through line 146 passes to increase nozzle area box 120 to increase the minimum nozzle area by 5%.

Figure 7:
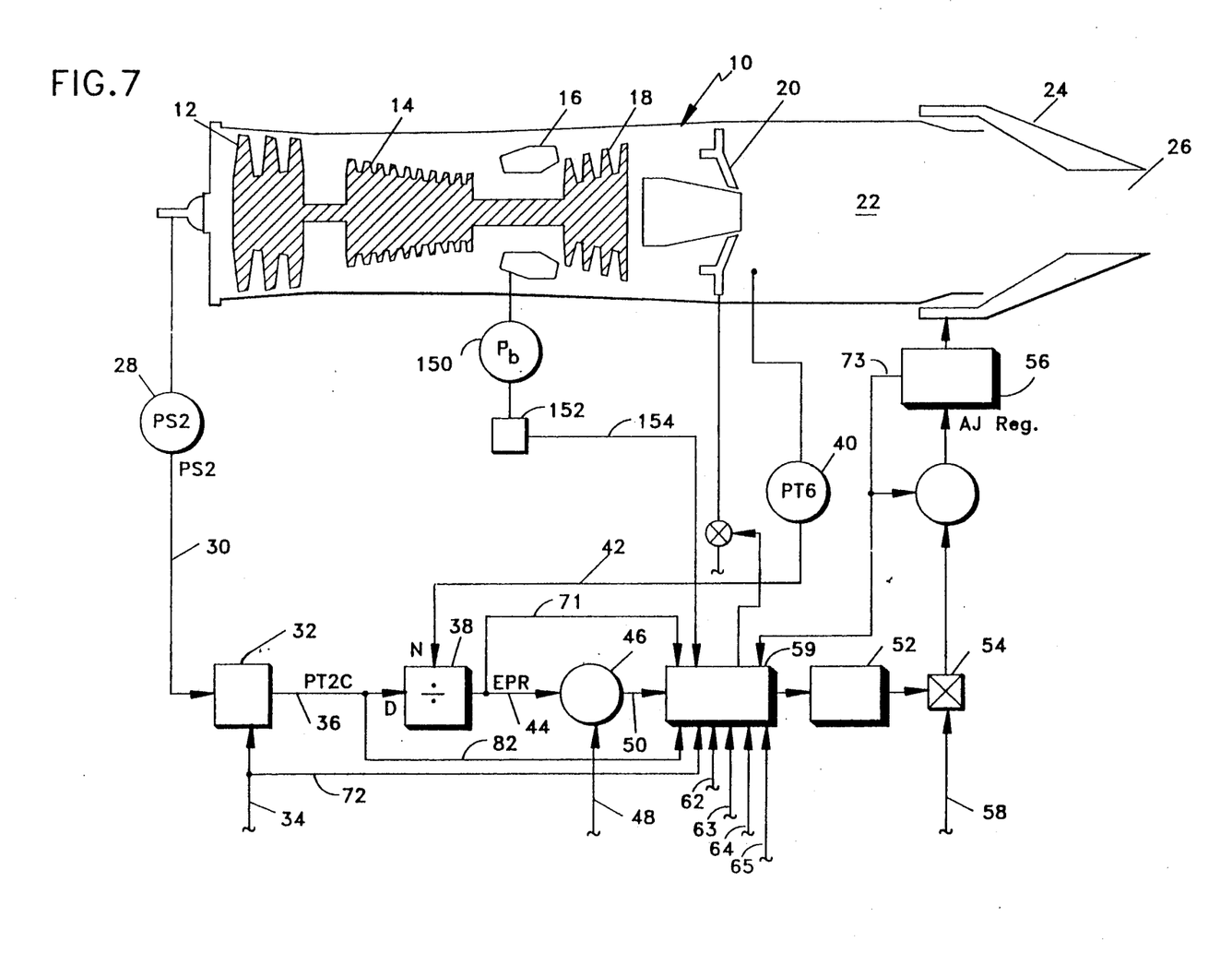
FIG. 7 is a modification of FIG. 1 showing application of the fan damage accommodation logic.

FIG. 7 illustrates the incorporation of the logic into the basic EPR control system. The central processing unit 59 permits the control signal in line 50 to pass through until modification of the signal is imposed by the unit 59.

Burner pressure sensor 150 sends a signal to stall detector 152. In the event of a stall a signal is sent through line 154 to the CPU 59.

The fan speed signal 34 is indicative of air flow and is sent as signal 72 to the CPU 59. Total pressure signal passing through line 36 is also sent to the CPU through line 82. A position signal 73 representing nozzle area is sent to the CPU. Also, the actual pressure ratio signal in line 44 is sent through line 71 to the CPU 59.

Steady state signal 63 and nonaugmentation signal 64 enter the CPU. Signal 62 entering the CPU indicates that the appropriate sensors have no failure indication, while signal 64 indicates that operation is within preselected limits.

In response to logic 116, a signal for inhibiting augmentor or after-burner operation is sent through control line 156 to block valve 158.

We claim:

1. A gas turbine engine having:
a compressor;
a turbine;
an augmentor;
a variable area exhaust nozzle;
a known anticipated EPR value for any operating airflow and nozzle area condition, representing an undamaged compressor;
EPR sensing means for sensing the actual EPR and producing an actual EPR signal;
nozzle position sensing means for determining nozzle area;
nozzle adjusting means for varying the nozzle area;
stall detecting means;
an EPR control mode comprising said nozzle adjusting means responsive to said EPR sensing means;
a base control mode comprising a fixed nozzle area operation mode;
characterized by:
EPR error calculation means for establishing a quantitative actual EPR error signal by comparing the actual EPR signal to said anticipated EPR value;
fan damage detect means defining a tolerable EPR fan damage error;
damage comparison means for comparing said actual EPR error signal to said tolerable EPR fan damage error of said fan damage detect means and establishing a fan damage signal, if said EPR error signal exceeds said tolerable EPR fan damage error;
a stall detect means for detecting an immediately preceding stall;
fan damage accommodation means defining a predicted stall limit nozzle area as a function of potential EPR error signal, and including damage accommodation comparison means for applying said actual EPR error signal as said potential EPR error of said fan damage accommodation means and determining a corresponding nozzle area; and
minimum area limit means responsive to said damage accommodation means, or limiting the minimum area of said nozzle to said corresponding area, but only in the presence of a detected fan damage signal and an immediately preceeding stall.

2. A gas turbine engine as in claim 1:
means for setting a fan damage flag in response to a fan damage signal but only in the presence of a detected immediately preceeding stall, said fan damage detect means also defining a tolerable EPR sensor error;
said damage comparison means also including means for comparing said actual EPR error signal to said tolerable EPR sensor error and establishing a null error signal when said actual EPR error signal is less than said tolerable EPR sensor error; and
means responsive to said null error signal for resetting said fan damage flag and for returning to normal EPR control mode.

3. A gas turbine engine, as in claim 1:
a fan damage flag;
means for setting said fan damage flag in response to said actual EPR error signal exceeding said tolerable EPR fan damage error, but only in presence of a detected immediately preceeding stall;
said damage comparison means inoperative in the presence of a set stall detect flag; and
said fan damage accommodation means including ratchet means operative in the presence of a said fan damage flag to increase said minimum area limit means a preselected amount in the event of a subsequent stall.

4. A gas turbine engine as in claim 3:
a sensor error flag;
means for setting said sensor error flag in response to said EPR actual error signal exceeding said tolerable EPR fan damage error, but only in the absence of a set stall detect flag;
and said ratchet means operative also in response to a subsequent stall in the presence of a said sensor error flag.

5. A gas turbine engine as in claim 3:
inhibit means for prohibiting augmentor operation in the presence of a set fan damage flag.

6. A gas turbine engine as in claim 3:
said fan damage detect means also defining a tolerable EPR sensor error;
said damage comparison means also including means for comparing said actual EPR error signal to said tolerable EPR sensor error and establishing a null error signal when said actual EPR error signal is less than said tolerable EPR sensor error; and
means responsive to said null error signal for resetting said fan damage flag and for returning to normal EPR control mode;
and said means responsive to said null error also for permitting augmentor operation.

7. A gas turbine engine as in claim 1:
enable logic means for rendering said damage comparison means inoperative in response to selected logic input parameters which could produce erroneous results.

8. A gas turbine engine as in claim 7, wherein:
said selected logic input parameters include a failed sensor error, a nonsteady state signal, and below minimum speed signal.

9. A gas turbine engine as in claim 1, wherein:
   said EPR error calculation means includes means defining said anticipated EPR value as a function of an airflow and nozzle area.

10. A gas turbine engine as in claim 1:
    said fan damage detect means includes means for defining tolerable EPR fan damage error as a function of total pressure at the engine inlet.

11. A gas turbine engine as in claim 1:
    said fan damage accommodation means also defining a limit nozzle area as of function of a preselected engine thrust, and said damage accommodation means determining the lesser of the area based on the stall limit and the are based thrust.

* * * * *

UNITED STATES PATENT AND TRADEMARK OFFICE
CERTIFICATE OF CORRECTION

PATENT NO. : 5,072,580

DATED : December 17, 1991

INVENTOR(S) : Gregory S. Patterson, et. al.

It is certified that error appears in the above-identified patent and that said Letters Patent is hereby corrected as shown below:

Column 8, Claim 1, Line 4 after "means," "or" should be --for--

Column 10, Claim 11, Line 8 before "based" "are" should be --area--

Signed and Sealed this

Eighth Day of June, 1993

Attest:

MICHAEL K. KIRK

*Attesting Officer*   Acting Commissioner of Patents and Trademarks